US009361329B2

(12) United States Patent
Chen et al.

(10) Patent No.: US 9,361,329 B2
(45) Date of Patent: Jun. 7, 2016

(54) MANAGING TIME SERIES DATABASES

(71) Applicant: International Business Machines Corporation, Armonk, NY (US)

(72) Inventors: Xiao Yan Chen, Beijing (CN); Yao Liang Chen, Beijing (CN); Sheng Huang, Shanghai (CN); Kai Liu, Beijing (CN); Chen Wang, Beijing (CN)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 230 days.

(21) Appl. No.: 14/105,660

(22) Filed: Dec. 13, 2013

(65) Prior Publication Data

US 2015/0169654 A1    Jun. 18, 2015

(51) Int. Cl.
*G06F 17/30* (2006.01)
(52) U.S. Cl.
CPC .... *G06F 17/30312* (2013.01); *G06F 17/30551* (2013.01); *G06F 17/30619* (2013.01)
(58) Field of Classification Search
USPC ......................................... 707/743, 693, 741
See application file for complete search history.

(56) References Cited

U.S. PATENT DOCUMENTS

| | | | |
|---|---|---|---|
| 5,905,814 A * | 5/1999 | Mochizuki .............. | G06T 9/005 382/238 |
| 6,496,817 B1 | 12/2002 | Whang et al. | |
| 6,778,981 B2 | 8/2004 | Lee et al. | |
| 7,433,527 B2 | 10/2008 | Takayama et al. | |
| 7,966,327 B2 | 6/2011 | Li et al. | |
| 8,219,574 B2 | 7/2012 | Liu et al. | |
| 2005/0114331 A1 | 5/2005 | Wang et al. | |
| 2007/0294247 A1* | 12/2007 | Papadimitriou ... | G06K 9/00496 |
| 2013/0103657 A1* | 4/2013 | Ikawa ............... | G06F 17/30321 707/693 |
| 2014/0032566 A1* | 1/2014 | Agarwal ........... | G06F 17/30011 707/741 |
| 2014/0172867 A1* | 6/2014 | Lin .................... | G06F 17/30545 707/741 |
| 2014/0172868 A1* | 6/2014 | Lin .................... | G06F 17/30545 707/741 |
| 2015/0026207 A1* | 1/2015 | Bharti .............. | G06F 17/30595 707/769 |

OTHER PUBLICATIONS

R. Agrawal, "Fast Similarity Search in the Presence of Noise, Scaling, and Translation in Time-Series Databases," Proceedings of the 21th Interntional Conference on Very Large Data Bases, 1995, pp. 1-10.
A. Camerra, "iSAX 2.0: Indexing and Mining One Billion Time Series," ICDM '10 Proceedings of the 2010 IEEE International Conference on Data Mining, 2010, pp. 1-10.
Muhammad Marwan Muhammad Fuad, "Time Series Retrieval Using Multiple Reduced Spaces," Fourth IEEE International Conference on Semantic Computing (ICSC2010), 2010, pp. 1-8.

(Continued)

*Primary Examiner* — Cam-Linh Nguyen
(74) *Attorney, Agent, or Firm* — Cantor Colburn LLP; David Quinn

(57) ABSTRACT

A method for building indices for a time sequence in a time series database includes dividing, using a processing device, a time sequence in the time series database into a plurality of subsequences based on a sliding window; building spatial indices for the plurality of subsequences, the spatial indices being used for defining spatial locations of subsequences in the plurality of subsequences in the time sequence; and building content indices for the plurality of subsequences, the content indices being used for defining content ranges of subsequences in the plurality of subsequences.

15 Claims, 9 Drawing Sheets

(56) References Cited

OTHER PUBLICATIONS

E. Keogh, "Dimensionality Reduction for Fast Similarity Search in Large Time Series Databases," Knowledge and Information Systems, Aug. 2001, vol. 3, Issue 3, pp. 1-19.

Wikipedia, [online]; [retrieved on Oct. 3, 2013]; retrieved from the Internet http://en.wikipedia.org/wiki/R-tree Wikipedia, "R-tree," Wikimedia Foundation Inc. 2013; pp. 1-7.

Chinese Application No. 201210507004.X, Filed: Nov. 30, 2012, "Managing Time Series Databases", Inventors: Xiao Yan Chen, et al., pp. 1-35.

* cited by examiner

MANAGING TIME SERIES DATABASES

BACKGROUND

Embodiments of the present invention relate to database management, and more specifically, to a method and apparatus for managing time series databases.

With the development of computer, data communication and real-time monitoring technologies, time series databases have been widely applied to many aspects such as device monitoring, production line management and financial analysis. A time sequence refers to a set of measured values that are arranged in temporal order, and a node where a measured value is stored can be called a data point or a data event. A time series database refers to a database for storing these measured values. Measured values may comprise various kinds of data. For example, in an application environment of monitoring bridge security, data being collected may comprise pressure data and/or intensity of pressure data collected by certain sensors; in an application environment of weather forecast, data being collected may comprise temperature, humidity, pressure, wind force (e.g., including magnitude and direction), etc.

Similarity search refers to finding in a time series database a sequence that is similar to a given sequence pattern. A time series database usually comprises massive data and is continuously updated in real time by recent measured values. For example, in an application environment of monitoring bridge security, thousands of sensors might be deployed on the bridge for measuring, in real time, temperature, humidity, pressure and wind force. When a database is updated with a frequency of 1 second or even higher frequencies, a huge amount of data will be produced. Therefore, how to conduct a similarity search in a time series database with a rapidly growing amount of data has currently become one of research focuses in the database field.

Technical solutions for accelerating similarity search have been developed so far. These technical solutions propose to first return a candidate set and then verify candidates in the candidate set in a time series database, thereby reducing query time. However, a candidate set usually consists of many candidates, and to verify candidates one by one will produce huge data I/O overheads and occupy a considerable time.

With the wide application of time series databases in various industries, databases' providers, managers and end users pay more and more attention to the efficiency of database queries. Therefore, it becomes a pressing issue as to how to further reduce overheads of various resources in similarity search.

SUMMARY

In one embodiment, a method for building indices for a time sequence in a time series database includes dividing, using a processing device, a time sequence in the time series database into a plurality of subsequences based on a sliding window; building spatial indices for the plurality of subsequences, the spatial indices being used for defining spatial locations of subsequences in the plurality of subsequences in the time sequence; and building content indices for the plurality of subsequences, the content indices being used for defining content ranges of subsequences in the plurality of subsequences.

In another embodiment, a method for querying in a time series database includes based on spatial indices for a time sequence in the time series database, searching with a processing device in the time sequence in the time series database for a spatial location that corresponds to a query sequence; based on content indices for the time sequence in the time series database, obtaining a content range of a subsequence at the found spatial location; and in response to the obtained content range being the same as a content range of the query sequence, outputting the subsequence at the found spatial location, wherein the spatial indices are used for defining spatial locations of subsequences of the time sequence in the time sequence, and the content indices are used for defining content ranges of subsequences of the time sequence.

In another embodiment, an apparatus for building indices for a time sequence in a time series database includes a dividing module configured to divide a time sequence in the time series database into a plurality of subsequences based on a sliding window; a spatial index building module configured to build spatial indices for the plurality of subsequences, the spatial indices being used for defining spatial locations of subsequences in the plurality of subsequences in the time sequence; and a content index building module configured to build content indices for the plurality of subsequences, the content indices being used for defining content ranges of subsequences in the plurality of subsequences.

BRIEF DESCRIPTION OF THE SEVERAL VIEWS OF THE DRAWINGS

Through the more detailed description of some embodiments of the present disclosure in the accompanying drawings, the above and other objects, features and advantages of the present disclosure will become more apparent, wherein the same reference generally refers to the same components in the embodiments of the present disclosure.

DETAILED DESCRIPTION

Figure 1:
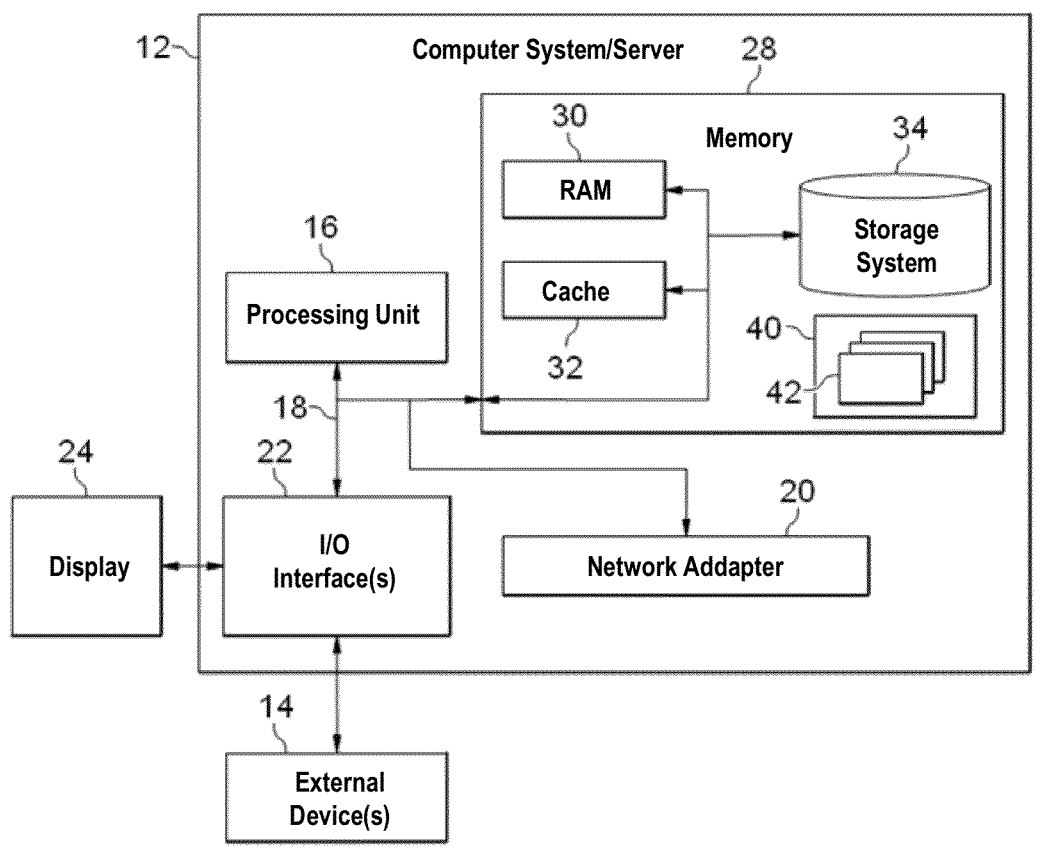
FIG. 1 illustrates an exemplary computer system/server which is applicable to implement the embodiments of the present invention.

In view of the above, it is desired to develop a technical solution capable of fast queries in a time series database, and it is desired that the technical solution can reduce the occupation of various resources when querying the time series database and then improve the efficiency of similarity search. Further, it is desired to implement the technical solution while keeping existing time series databases unchanged as much as possible.

In one aspect of the present invention, there is provided a method for building indices for a time sequence in a time series database, comprising: dividing a time sequence in the time series database into a plurality of subsequences based on a sliding window; building spatial indices for the plurality of subsequences, the spatial indices being used for defining spatial locations of subsequences in the plurality of subsequences in the time sequence; and building content indices for the plurality of subsequences, the content indices being used for defining content ranges of subsequences in the plurality of subsequences.

In one aspect of the present invention, the building content indices for the plurality of subsequences comprises: mapping a subsequence in the plurality of subsequences to a symbol value corresponding to a content range of the subsequence.

In one aspect of the present invention, there is further comprised: storing a symbol value corresponding to a subsequence in the plurality of subsequences as metadata associated with the spatial indices.

In one aspect of the present invention, there is provided a method for querying in a time series database, comprising: based on spatial indices for a time sequence in the time series database, searching in the time sequence in the time series database for a spatial location that corresponds to a query sequence; based on content indices for a time sequence in the time series database, obtaining a content range of a subsequence at the found spatial location; and in response to the obtained content range being the same as a content range of the query sequence, outputting the subsequence at the found spatial location, wherein the spatial indices are used for defining spatial locations of subsequences of the time sequence in the time sequence, and the content indices are used for defining content ranges of subsequences of the time sequence.

In one aspect of the present invention, the content index comprises a symbol value corresponding to a content range of a subsequence of the time sequence.

In one aspect of the present invention, a symbol value corresponding to a subsequence in the plurality of subsequences is stored as metadata associated with the spatial indices.

In one aspect of the present invention, there are further provided an apparatus for building indices for a time sequence in a time series database, an apparatus for querying in a time series database, and a method and apparatus for managing a time series database.

With the methods and apparatuses as disclosed in embodiments of the present invention, while keeping configurations of existing time series databases unchanged as much as possible, indices may be built for a time sequence in a time series data, time overheads for similarity search may be reduced based on the indices, and further the efficiency of data queries improved.

Exemplary embodiments will be described in more detail with reference to the accompanying drawings, in which the preferable embodiments of the present disclosure have been illustrated. However, the present disclosure can be implemented in various manners, and thus should not be construed to be limited to the embodiments disclosed herein. On the contrary, those embodiments are provided for the thorough and complete understanding of the present disclosure, and completely conveying the scope of the present disclosure to those skilled in the art.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or one embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

FIG. 1 illustrates an exemplary computer system/server 12 which is applicable to implement the embodiments of the present invention. The computer system/server 12 as illustrated in FIG. 1 is only an example, which should not construct any limitation to the functions and application scope of the embodiments of the present invention.

As illustrated in FIG. 1, the computer system/server 12 is embodied in the form of a general computing device. Components of the computer system/server 12 may comprise, but not limited to, one or more processors or processing units 16, a system memory 28, and a bus 18 connecting different system components (including the system memory 28 and the processing unit 16).

The system bus 18 indicates one or more of a plurality of bus structures, including a memory bus or a memory controller, a peripheral bus, a graphic acceleration port, a processor, or a local bus using any bus structure in the plurality of bus structures. For example, the above hierarchical structures include, but not limited to, an industrial standard architecture (ISA) bus, a MicroChannel Architecture (MAC) bus, an enhanced-ISA bus, a video electronic standard association (VESA) local bus, and a peripheral component interconnection (PCI) bus.

The computer system/server 12 typically comprises various kinds of computer system-readable mediums. These mediums may be any available mediums accessible by the computer system/server 12, comprising volatile and non-volatile mediums, mobile and non-mobile mediums.

The system memory 28 may comprise a computer system readable medium in a form of volatile memory, for example, a random access memory (RAM) 30 and/or a cache memory 32. The computer system/server 12 may further comprise other mobile/non-mobile, volatile/non-volatile computer system storage mediums. As an example, the memory system 34 may be used to read/write a non-mobile, non-volatile magnetic medium (not illustrated in FIG. 1, generally called "a hard disk driver"). Although not illustrated in FIG. 1, a magnetic disk driver for reading/writing a mobile, non-volatile magnetic disk (for example, a "floppy disk") and an optical disk driver for reading/writing a mobile, non-volatile optical disk (for example, CD-ROM, DVD-ROM, or other optical medium) may be provided. In these cases, each driver may be connected to the bus 18 via one or more data medium interfaces. The memory 28 may comprise at least one program product that has a set (for example, at least one) program modules, and these program modules may be configured to perform the functions of various embodiments of the present invention.

A program/utility tool 40 comprising a set (at least one) of a program module 42 may be stored in for example the memory 28; such program module 42 comprises, but not limited to, an operating system, one or more applications, other program modules, and program data, and each of these examples or a certain combination thereof might comprise implementation of a network environment. The program module 42 generally executes the functions and/or methods in the embodiments as described according to the present invention.

The computer system/server 12 may also communicate with one or more peripheral devices 14 (for example, a keypad, a pointing device, a display 24, etc.), and may also communicate with one or more device that enable the user to interact with the computer system/server 12, and/or communicate with any device (for example, network card, modem, etc.) that enables the computer system/server 12 to communicate with one or more other computing devices. Such communication may be performed via an input/output (I/O) interface 22. Moreover, the computer system/server 12 may also communicate with one or more networks (for example, a local area network (LAN), a wide area network (WAN), and/or a public network, for example, Internet). As illustrated in the figure, a network adaptor 20 communicates with other modules of the computer system/server 12 via the bus 18. It should be appreciated that although not illustrated in the figure, other hardware and/or software modules may be used in combination with the computer system/server 12, including, but not limited to, micro-code, device driver, redundancy processing unit, external disk driving array, RAID system, magnetic tape driver, and a data backup storage system, etc.

Note that one or more virtual machines may run on the above-described one or more computer systems/servers and a single virtual machine may be distributed on one or more computer systems/servers. The computer system/server illustrated with reference to FIG. 1 is merely an example for implementing a method and apparatus of the present invention; with the development of hardware technology and virtual machine technology, the method and apparatus of the present invention may further be implemented on other device with data processing capability.

Figure 2:
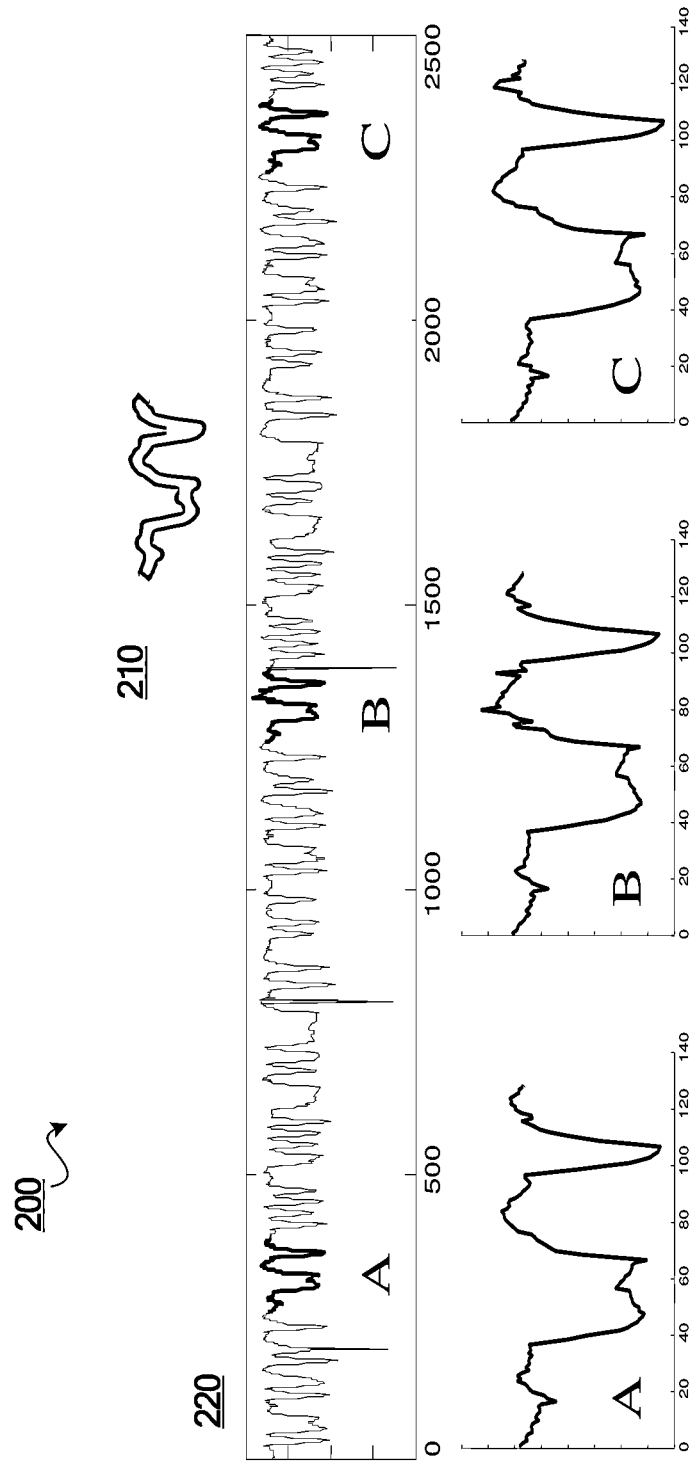
FIG. 2 schematically illustrates a diagram of a procedure for carrying out a similarity search in a time series database.

FIG. 2 schematically illustrates a diagram 200 of a procedure for carrying out a similarity search in a time series database. FIG. 2 illustrates a time sequence 220 in a time series database, and a query sequence involved in the similarity search is denoted by a reference numeral 210. In this context, the similarity search refers to searching in time sequence 220 for a subsequence that is similar to query sequence 210. For example, a set of returned candidate subsequences may comprise three subsequences, which are illustrated as subsequence A, subsequence B and subsequence C, respectively. Since the length of the time sequence illustrated in FIG. 2 is relatively small, the query result returns only 3 subsequences. When searching in a larger or super-large time sequence (for example, searching for a specific query sequence in a time series database that comprises meteorological data of 5 years), it is highly possible that thousands of candidate subsequences will be returned.

So far technical solutions capable of outputting more accurate candidate subsequences have been developed. These technical solutions can map data in a time series database from a time domain to a frequency domain, and build spatial indices based on characteristic frequencies in the frequency domain to simplify the complexity of carrying out similarity search in the time series database and further reduce various overheads of similarity search by means of a method of considering main frequencies and ignoring trivial frequencies. However, these technical solutions merely consider spatial relationships in the time series database, so the candidate set being outputted is still a super set that is much larger than a subsequence set meeting similarity conditions, and the effect is not ideal at all. Therefore, it is desired to propose a technical solution capable of improving the management of a time series database that uses only spatial indices, and also it is desired that the technical solution can accelerate query speed by considering other features of the database.

Figure 3:
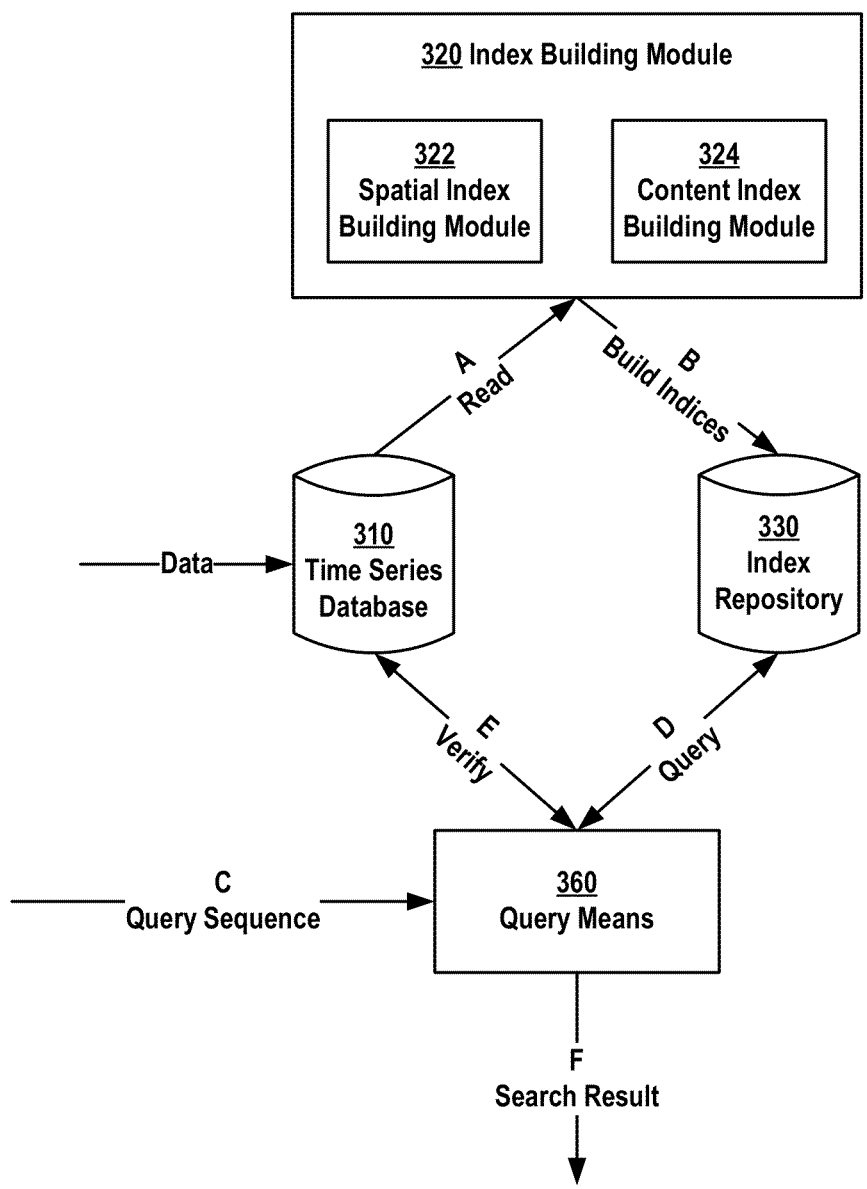
FIG. 3 schematically illustrates an architectural view of a technical solution for managing a time series database according to one embodiment of the present invention.

In one embodiment of the present invention, there is proposed a method and apparatus for building double indices (spatial indices and content indices) for a time series database and increasing the similarity search efficiency based on the double indices. FIG. 3 schematically illustrates an architectural view 300 of a technical solution for managing a time series database according to one embodiment of the present invention.

Note that indices may be built for time sequences already stored in a time series database, and indices may also be built almost at the same time as collecting measured data in real time and storing the measured data to a time series database. As illustrated in FIG. 3, there is arranged an index building module 320 so as to, after data being collected in real time comes into a time series database 310, read data in database 310 (as illustrated by arrow A), build spatial indices and content indices for data in time series database 310 (as illustrated by arrow B), and store to an index repository 330 the double indices having been built.

Note that here index repository 330 may take various forms and the storage location of index repository 330 is not restricted. For example, index repository 330 may be stored in time series database 310 or stored independently of time series database 310. For example, index repository 330 may be stored in a data storage device such as a hard disk; further, to increase the speed in accessing indices as much as possible, index repository 330 may be located in a memory. Note that the procedure of building double indices may be in parallel to the procedure of updating the time series database, and double indices gradually increase as contents in the database increase.

When carrying out similarity search, in response to receipt of a query sequence (as illustrated by arrow C), query means 360 queries double indices in index repository 330, i.e., first obtaining a spatial location of a subsequence associated with the query sequence through spatial indices, then comparing through content indices whether the content range of the subsequence at the spatial location is the same as that of the query sequence or not, and if yes, deeming the subsequence similar to the query sequence (as illustrated by arrow D). Afterwards, the subsequence may be added to a candidate set. The number of subsequences generated as such in the candidate set will be greatly reduced. Moreover, since it is compared in advance based on content indices whether the query sequence is approximately similar to each subsequence, amounts of useless data that might be generated when obtaining the candidate set based on only spatial indices may be filtered, and further data I/O overheads, computing resource overheads and time overheads may be reduced while verifying candidate subsequences in the candidate set one by one against original time series database 310 (as illustrated by arrow E). Finally, query means 360 will output a search result (as illustrated by arrow F).

Based on the architecture illustrated in FIG. 3, in one embodiment of the present invention there is provided a method for building indices for a time sequence in a time series database, comprising: dividing a time sequence in the time series database into a plurality of subsequences based on a sliding window; building spatial indices for the plurality of subsequences, the spatial indices being used for defining spatial locations of subsequences in the plurality of subsequences in the time sequence; and building content indices for the plurality of subsequences, the content indices being used for defining content ranges of subsequences in the plurality of subsequences.

Figure 4A:
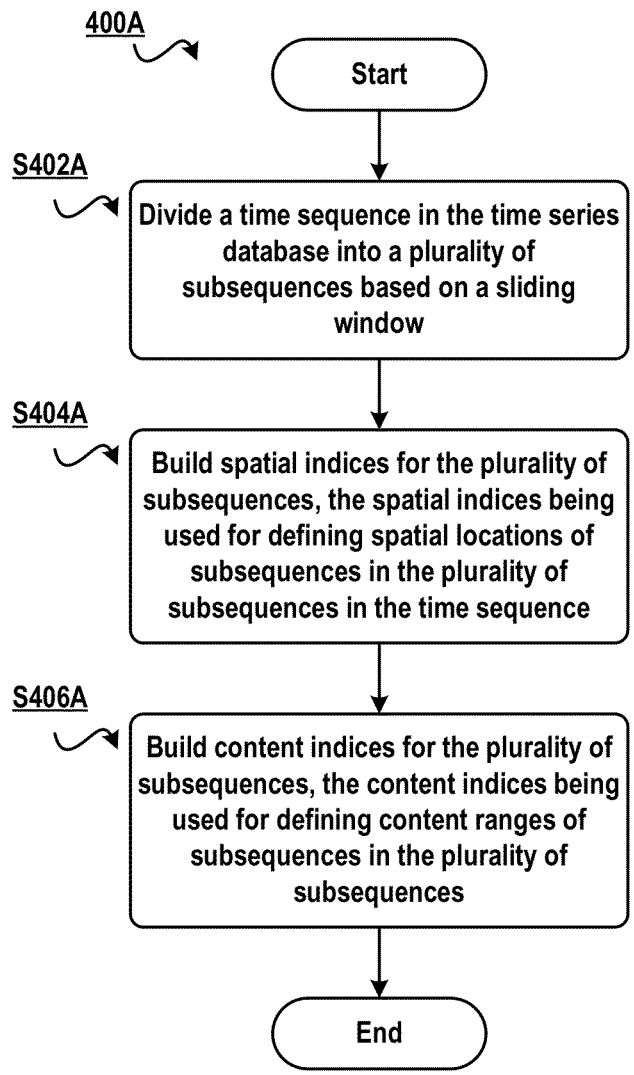
FIG. 4A schematically illustrates a flowchart of a method for building indices for a time sequence in a time series database according to one embodiment of the present invention.

FIG. 4A schematically illustrates a flowchart 400A of a method for building indices for a time sequence in a time series database according to one embodiment of the present invention. Beginning in block S402A, a time sequence in the time series database is divided into a plurality of subsequences based on a time window. Those skilled in the art may define the length of the sliding window by themselves. The dividing a time sequence may be implemented based on principles of the sliding window. For example, when the length of the sliding window is N and the step is 1, the first subsequence may be $1^{st}$-$N^{th}$ data points, the second subsequence may be $2^{nd}$-$(N+1)^{th}$ data points, and so on and so forth. Alternatively, the sliding window may also be set to an integer greater than 1, so as to reduce the workload for division.

In block S404A, spatial indices are built for the plurality of subsequences, the spatial indices being used for defining spatial locations of subsequences in the plurality of subsequences in the time sequence. The spatial indices may take the form of a tree structure, or those skilled in the art may further take other forms based on solutions in the prior art.

In block S406A, content indices are built for the plurality of subsequences, the content indices being used for defining content ranges of subsequences in the plurality of subsequences. In this embodiment, the content range of a subsequence may refer to the range of values of data points which the subsequence comprises. For example, when a time sequence relates to temperature collected at predetermined time intervals and each subsequence comprises N data points, the content range may refer to the range $[T_{min},T_{max}]$ between the highest value and the lowest value among N temperature values.

In one embodiment of the present invention, for example, if a specific subsequence corresponds to a node 1 in a spatial subsequence, an additional data item may be added to node 1 for describing a content range related to the specific subsequence. In other words, content indices may be integrated with spatial indices.

It will be noted that if spatial indices are already built for the time series database, then only block S406A is performed with respect to the database; if no index has been built for the database, then block S404A and S406A may be performed simultaneously, or block S406A may be performed first and block S404A performed subsequently.

In one embodiment of the present invention, the building content indices for the plurality of subsequences comprises:

mapping a subsequence in the plurality of subsequences to a symbol value corresponding to a content range of the subsequence.

For example, a mapping table between content ranges and symbol values may be built. Suppose the time series database stores temperature sequences with measured values ranging between 0 and 20° C., then mapping relationships as illustrated in Table 1 may be used:

TABLE 1

| Number | Content Range | Symbol Value |
|---|---|---|
| 1 | 0° C. ≤ T < 1° C. | a |
| 2 | 1° C. ≤ T < 2° C. | b |
| ... | | |
| 20 | 19° C. ≤ T ≤ 20° C. | t |

Note Table 1 merely schematically illustrates an example of mapping relationships. Those skilled in the art may design, by themselves, mapping relationships according to different data types in data points. For example, in the foregoing example, each symbol value may represent different ranges, e.g., "a" may represent a range between 0 and 2° C., and "b" may represent a range between 2 and 6° C.

In one embodiment of the present invention, the symbol value corresponding to a subsequence in the plurality of subsequences is stored as metadata associated with the spatial indices.

Symbol values corresponding to subsequences may be obtained synchronously with building spatial indices. In the mapping relationships illustrated in Table 1, symbol values may be selected from a group of 20 characters comprising a, b, c, . . . , and t. Specifically, for example, a time sequence is divided into 20 subsequences, symbol values associated with various subsequences are respectively s, t, . . . , and these subsequences correspond to node 1, node 2, . . . , node 20 in spatial indices, respectively; then, the symbol value "s" that is associated with the $1^{st}$ subsequence may be used as metadata of node 1, the symbol value "t" that is associated with the $2^{nd}$ subsequence used as metadata of node 2, etc.

In one embodiment of the present invention, the building spatial indices for the plurality of subsequences comprises: converting the plurality of subsequences to a frequency domain based on Linear Discrete Transform; and building spatial indices for the plurality of subsequences according to characteristic frequencies in the frequency domain.

First of all, the time sequence is converted to the frequency domain, and then characteristic frequencies in the frequency domain are selected so as to build spatial indices for the simplified time sequence. In this embodiment, some trivial fluctuations in the time sequence curve are ignored whereas only factors describing the main shape are considered, so as to reduce various overheads for building spatial indices.

In one embodiment of the present invention, for example, the time sequence may be converted to the frequency domain based on Fourier Transform. Those skilled in the art may design specific implementation method by themselves and details are thus omitted here.

In one embodiment of the present invention, the converting the plurality of subsequences to the frequency domain based on Linear Discrete Transform comprises: dividing the plurality of subsequences into segments based on Segmentation Dimension Reduction (SDR); and converting the plurality of subsequences to the frequency domain based on the segments.

The SDR approach serves a purpose of further improving the efficiency of building spatial indices. The SDR principle lies in that the time sequence may be further divided into a plurality of segments, wherein each segment may comprise a plurality of data points; by solving a representative value in each segment, and the time sequence may be further simplified prior to being converted from the time domain to the frequency domain.

For example, when a subsequence comprises 30 data points, the subsequence is divided into 10 segments each comprising 3 data points, and an average value of the 3 data points in each segment is solved. At this point, the curve in the time domain is simplified to comprise 10 data points from 30 data points. Subsequently, the simplified time sequence is converted to the frequency domain for further processing.

In one embodiment of the present invention, the time sequence is decomposed into a plurality of one-dimensional time sequences, in response to the time sequence being a multi-dimensional time sequence. The multi-dimensional time sequence refers to a time sequence that comprises a multi-tuple. Specifically, FIGS. 5A and 5B schematically illustrate a diagram of a data point/data even in a time series database according to one embodiment of the present invention.

Figure 5A:
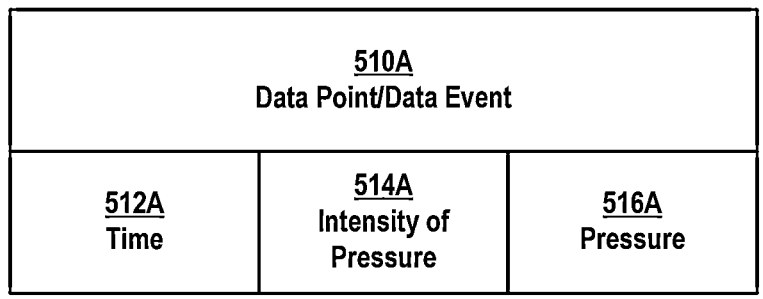
FIGS. 5A and 5B each schematically illustrate a diagram of a data point/data event in a time series database according to one embodiment of the present invention.
Figure 5B:
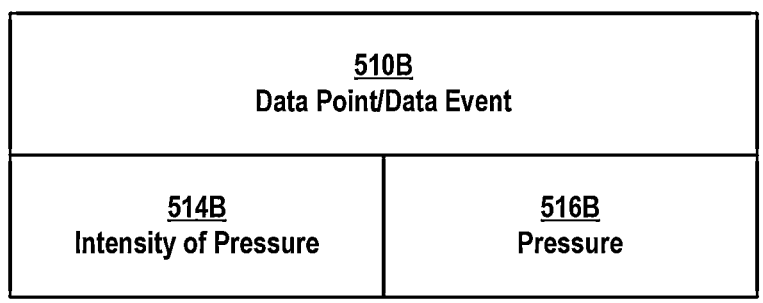

FIG. 5A illustrates a data structure 500A of a data point/data event, wherein a data point/data event 510A may comprise three portions, i.e., time 512A, intensity of pressure 514A and pressure 516A. Data point/data event 510A represents the intensity of pressure and the pressure that are collected at time 512A are 514A and 516A, respectively. When data is collected at the same time intervals, time 512A may be omitted. In a data structure 500B as illustrated in FIG. 5B, the meaning of intensity of pressure 514B and pressure 516B is the same as that in FIG. 5A.

For example, for a time sequence with a length of 4, {p1, p2,p3,p4}
={('15:30:02','2.3  Pa','2.5N'),('15:30:03','3.3  Pa', '15N'),('15:30:04','2.6 Pa','2. 3N'),('15:30:05','2.3 Pa', '2.9N')}, wherein in each data point/data event, the first item represents a timestamp, and the second and third items represent the intensity of pressure and the pressure being collected, respectively. At this point, the time sequence may be called a two-dimensional time sequence, which may be decomposed into two one-dimensional time sequences:
{('15:30:02','2.3 Pa'), ('15:30:03','3.3 Pa'), ('15:30:04', '2.6 Pa'), ('15:30:05','2.3 Pa')}; and
{('15:30:02','2.5N'), ('15:30:03','1.5N'), ('15:30:04', '2.3N'), ('15:30:05','2.9N')}.

At this point, the method described above may be performed to each resulting one-dimensional time sequence, and the spatial index and content index for each one-dimensional time sequence may be collectively called the spatial index and content index for the multi-dimensional time sequence.

In one embodiment of the present invention, the spatial index is an R-tree. R-trees are tree data structures used for spatial access methods, i.e., for indexing multi-dimensional information. Those skilled in the art may build spatial indices based on principles of the R-tree. For a detailed method, reference may be made to http://en.wikipedia.org/wiki/R-tree.

In the foregoing embodiments, there has been provided a method for building indices for a time sequence in a time series database. With the double index structure of the present invention, a candidate set meeting similarity search conditions may be obtained using spatial indices, and then the candidate set is filtered using content indices so as to provide a candidate set that better matches the search conditions and that comprises a less number of candidates, thereby improving the search efficiency. Note the method for building indices for a time sequence in a time series database is closely related to a search method for querying in a time series data, so the description of the same or similar concepts will be omitted below.

Figure 4B:
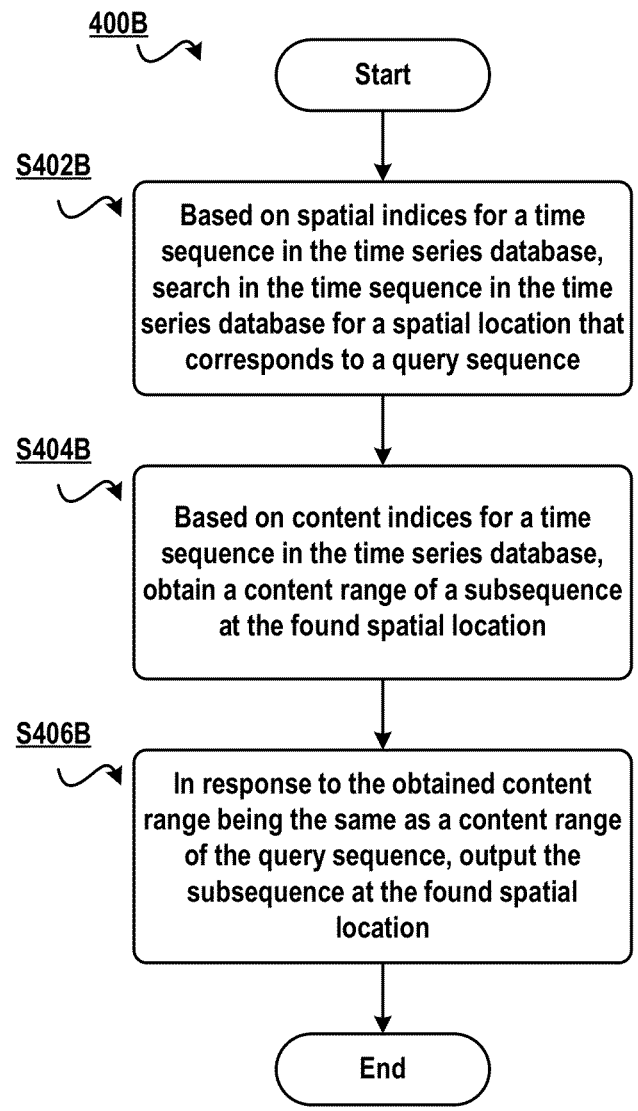
FIG. 4B schematically illustrates a flowchart of a method for querying in a time series database according to one embodiment of the present invention.

FIG. 4B schematically illustrates a flowchart 400B of a method for querying in a time series database according to one embodiment of the present invention. As illustrated in FIG. 4B, there is provided a method for querying in a time series database, comprising: based on spatial indices for a time sequence in the time series database, searching in the time sequence in the time series database for a spatial location that corresponds to a query sequence; based on content indices for a time sequence in the time series database, obtaining a content range of a subsequence at the found spatial location; and in response to the obtained content range being the same as a content range of the query sequence, outputting the subsequence at the found spatial location, wherein the spatial indices are used for defining spatial locations of subsequences of the time sequence in the time sequence, and the content indices are used for defining content ranges of subsequences of the time sequence.

Note the method for querying in a time series database as provided in this embodiment is a method for similarity search based on double indices. Specifically, in block S402B, based on spatial indices for a time sequence in the time series database, a spatial location that corresponds to a query sequence is sought for in the time sequence in the time series database, wherein the spatial indices are used for defining spatial locations of subsequences of the time sequence in the time sequence.

In block S404B, based on content indices for a time sequence in the time series database, a content range of a subsequence at the found spatial location is obtained, wherein the content indices are used for defining content ranges of subsequences of the time sequence. Since the content indices have recorded a content range of each subsequence, content ranges of subsequences at the found spatial locations may be obtained by the content indices corresponding to the spatial indices, and these content ranges are compared with a content range of the query sequence.

In block S406B, the subsequence at the found spatial location is outputted in response to the obtained content range being the same as the content range of the query sequence. In this embodiment, by comparing whether content ranges are identical or not, candidate subsequences that do not meet similarity search conditions may be filtered out initially, thereby providing a more accurate candidate set. Compared with methods of using only spatial indices in the prior art, the method of the present invention, after obtaining one or more spatial locations corresponding to a query sequence, further verifies whether content ranges of subsequences at these spatial locations are the same as a content range of the query sequence or not, thereby greatly improving the accuracy of a candidate set.

In one embodiment of the present invention, the content indices comprise: a symbol value corresponding to a content range of a subsequence of the time sequence. The search method according to this embodiment is a method for search based on the above-described spatial indices and content indices, so all provisions on the content indices are same as described above, and those skilled in the art may refer to Table 1 for implementation, which is not detailed here.

In one embodiment of the present invention, the symbol value corresponding to a subsequence in the plurality of subsequences is stored as metadata associated with the spatial indices. For example, metadata in the content indices may be additional data items added to various nodes in the spatial indices.

In one embodiment of the present invention, the searching, based on spatial indices for a time sequence in the time series database, in the time sequence in the time series database for a spatial location that corresponds to a query sequence comprises: converting the query sequence to a frequency domain based on Linear Discrete Transform; and according to characteristic frequencies in the frequency domain, searching in the time sequence in the time series database for a spatial location that corresponds to the query sequence via the spatial indices. Those skilled in the art may perform implementation according to principles of spatial indices, which is not detailed here. In one embodiment of the present invention, Linear Discrete Transform may be implemented based on Fourier Transform.

In one embodiment of the present invention, the converting the query sequence to the frequency domain based on Linear Discrete Transform comprises: dividing the query sequence into segments based on Segmentation Dimension Reduction; and converting the query sequence to the frequency domain based on the segments. Like the Segmentation Dimension Reduction used in building spatial indices, in the course of querying, the query sequence may also be divided into segments, and then spatial sequences are queried.

In one embodiment of the present invention, there is further comprised: dividing the query sequence into a plurality of query subsequences; and integrating spatial locations that are found and outputted for the plurality of query subsequences. When a query sequence is relatively long, the query sequence may be divided into a plurality of subsequences, then the above query method is performed for each subsequence, and subsequently various candidate sets are integrated. In one embodiment, the dividing may be implemented based on the length of a sliding window.

For example, the query sequence comprises 60 data points, and the length of the sliding window is 30, at which point, the query sequence may be divided into 2 subsequences. For example, candidate sets for the two query subsequences are S1 and S2, respectively, and then the integration step may comprise: for each subsequence a in candidate set S1, judging whether a subsequence b that closely follows subsequence a is present in candidate set S2 or not; if "yes," connecting subsequences a and b in series to form a subsequence ab as a member of an integrated candidate set.

In one embodiment of the present invention, there is further comprised a pre-processing operation: in response to the query sequence being a multi-dimensional time sequence, decomposing the query sequence into a plurality of one-dimensional query sequences. In one embodiment of the present invention, the spatial index is an R-tree. Those skilled in the art may refer to description of the foregoing method, which is not detailed here.

Figure 6:
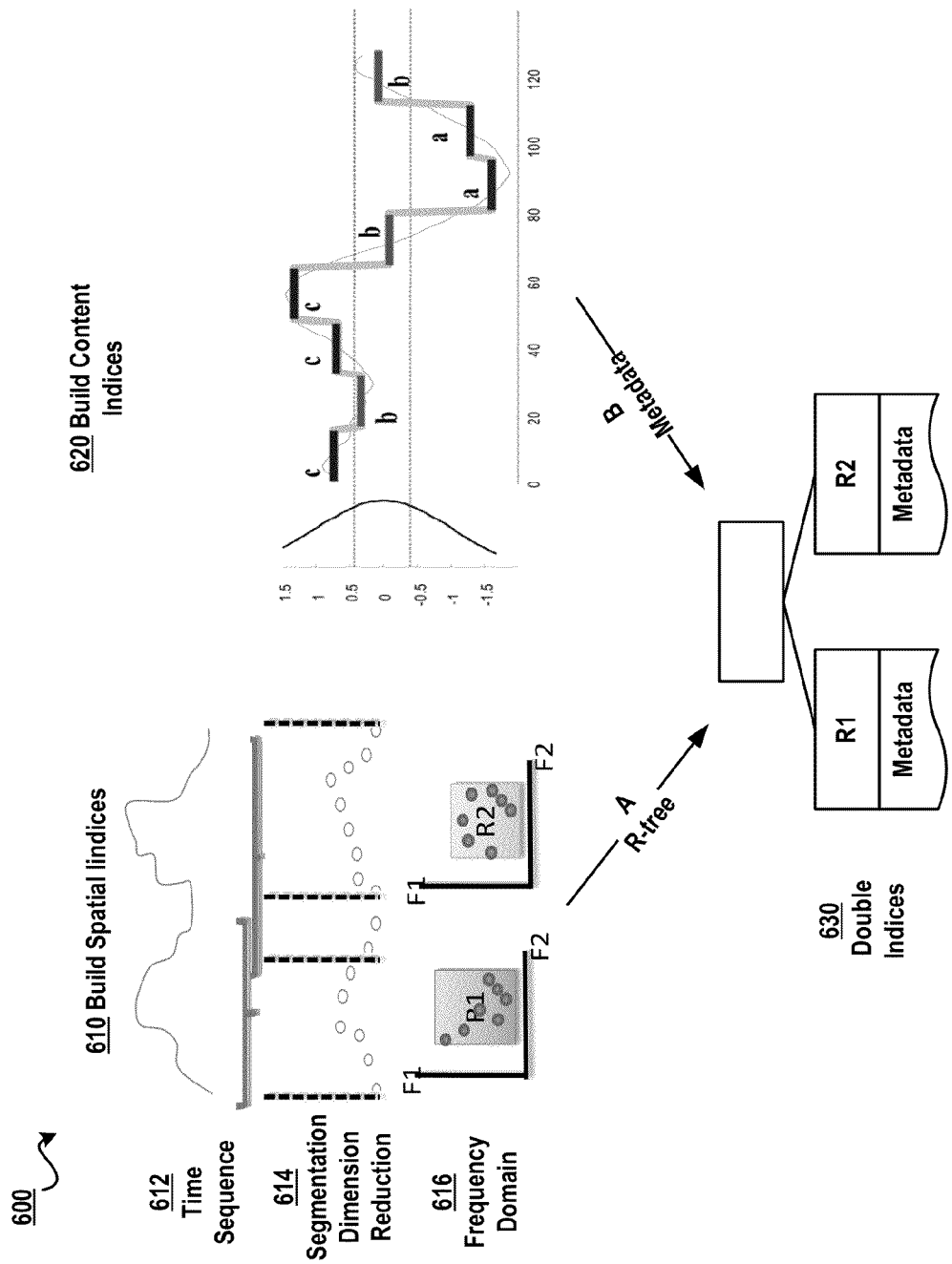
FIG. 6 schematically illustrates an architectural view of a technical solution for building spatial indices and content indices according to one embodiment of the present invention.

FIG. 6 schematically illustrates an architectural view 600 of a technical solution for building spatial indices and content indices according to one embodiment of the present invention. The left side of FIG. 6 illustrates a diagram 610 of building spatial indices, while the right side thereof illustrates a diagram 620 of building content indices. In the course of building spatial indices, for a time sequence being updated in real time, first Segmentation Dimension Reduction may be implemented 614, then subsequences as divided according to a sliding window are mapped to the frequency domain 616, and finally spatial indices represented by an R-tree are built (as illustrated by arrow A). Subsequences on which content indices are based may correspond to the subsequences on which the building spatial indices is based, symbol values of the subsequences may be obtained, and a symbol value corresponding to a subsequence in the plurality of subsequences may be stored as metadata associated with the spatial indices (as illustrated by arrow B), thereby generating double indices 630.

Figure 7:
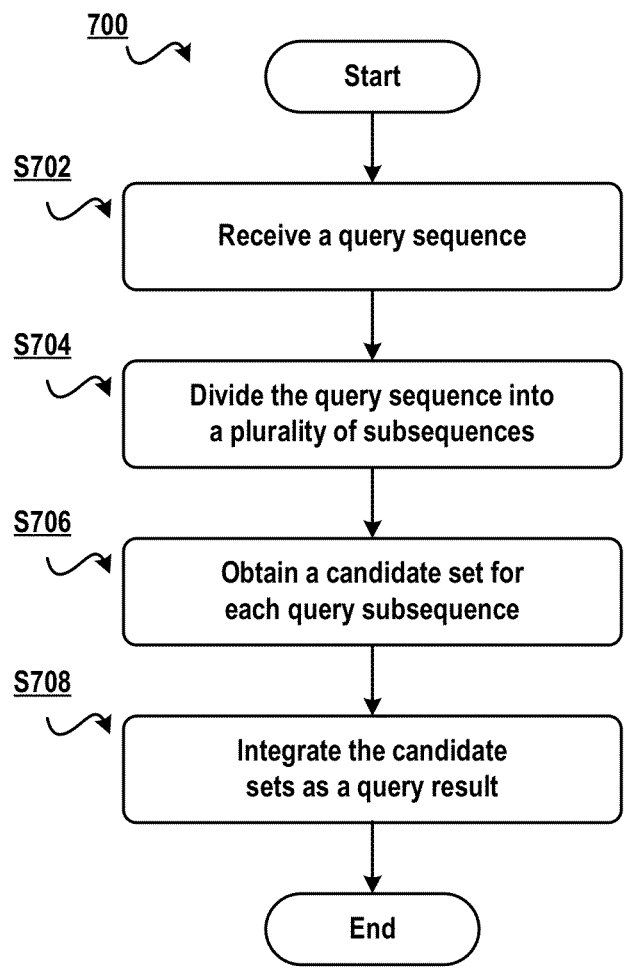
FIG. 7 schematically illustrates a flowchart of a method for obtaining a query result according to one embodiment of the present invention.

FIG. 7 schematically illustrates a flowchart 700 of a method for obtaining a query result according to one embodiment of the present invention. First, in block S702, a query sequence is received, and in block S704 the query sequence is divided into a plurality of query subsequences. Whether to perform the dividing operation in block S704 may be determined depending on the length of the query sequence and the length of a sliding window. Next, in block S706 a candidate set for each query subsequence is obtained using the method above described with reference to FIG. 4B, and in block S708 various query candidate sets are integrated into a query result.

In this embodiment, there is merely schematically illustrated an exemplary flow of the method for querying in a time series database. According to the disclosure, those skilled in the art may add or remove steps, or adjust the execution order of various steps.

Figure 8A:
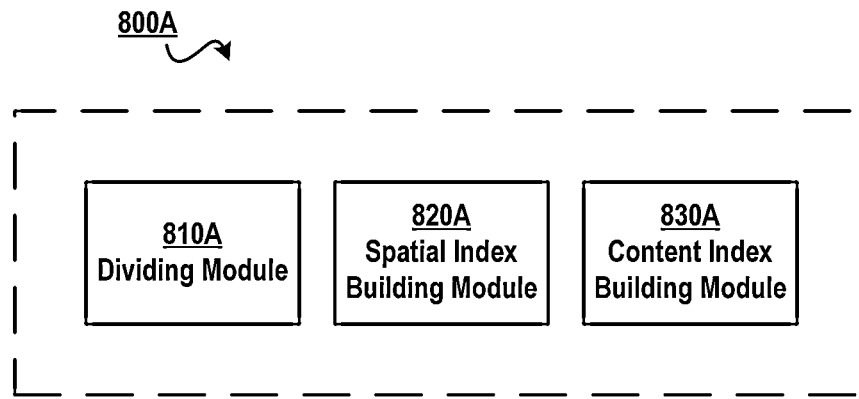
FIG. 8A schematically illustrates an architectural view of an apparatus for building indices for a time sequence in a time series database according to one embodiment of the present invention.

FIG. 8A schematically illustrates an architectural view 800A of an apparatus for building indices for a time sequence in a time series database according to one embodiment of the present invention. Specifically, there is illustrated an apparatus for building indices for a time sequence in a time series database, comprising: a dividing module 810A configured to divide a time sequence in the time series database into a plurality of subsequences based on a sliding window; a spatial index building module 820A configured to build spatial indices for the plurality of subsequences, the spatial indices being used for defining spatial locations of subsequences in the plurality of subsequences in the time sequence; and a content index building module 830A configured to build content indices for the plurality of subsequences, the content indices being used for defining content ranges of subsequences in the plurality of subsequences.

In one embodiment of the present invention, the spatial index building module comprises: a mapping module configured to map a subsequence in the plurality of subsequences to a symbol value corresponding to a content range of the subsequence.

In one embodiment of the present invention, there is further comprised: a storage module configured to store a symbol value corresponding to a subsequence in the plurality of subsequences as metadata associated with the spatial indices.

In one embodiment of the present invention, the spatial index building module comprises: a converting module configured to convert the plurality of subsequences to a frequency domain based on Linear Discrete Transform; and a building module configured to build spatial indices for the plurality of subsequences according to characteristic frequencies in the frequency domain.

In one embodiment of the present invention, the converting module comprises: a segmenting module configured to divide the plurality of subsequences into segments based on Segmentation Dimension Reduction; and a segment converting module configured to convert the plurality of subsequences to the frequency domain based on the segments.

In one embodiment of the present invention, there is further comprised: a decomposing module configured to, in response to the time sequence being a multi-dimensional time sequence, decompose the time sequence into a plurality of one-dimensional time sequences.

In one embodiment of the present invention, the spatial index is an R-tree.

Figure 8B:
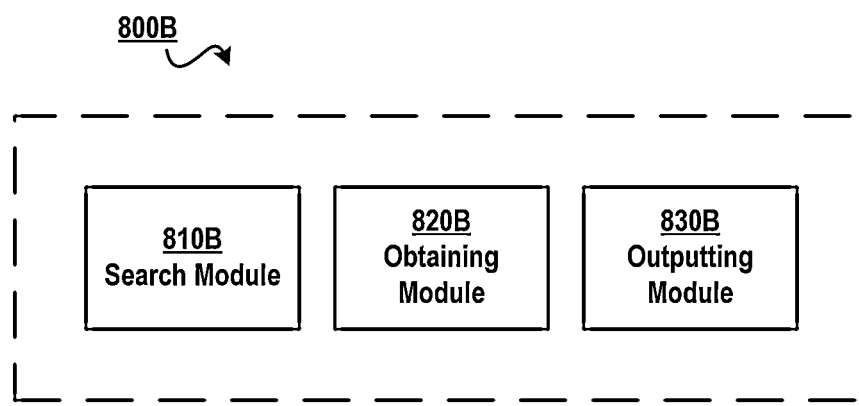
FIG. 8B schematically illustrates an architectural view of an apparatus for querying in a time series database according to one embodiment of the present invention.

FIG. 8B schematically illustrates an architectural view 800B of an apparatus for querying in a time series database according to one embodiment of the present invention. Specifically, there is illustrated an apparatus for querying in a time series database, comprising: a search module 810B configured to, based on spatial indices for a time sequence in the time series database, search in the time sequence in the time series database for a spatial location that corresponds to a query sequence; an obtaining module 820B configured to, based on content indices for a time sequence in the time series database, obtain a content range of a subsequence at the found spatial location; and an outputting module 830B configured to, in response to the obtained content range being the same as a content range of the query sequence, output the subsequence at the found spatial location, wherein the spatial indices are used for defining spatial locations of subsequences of the time sequence in the time sequence, and the content indices are used for defining content ranges of subsequences of the time sequence.

In one embodiment of the present invention, the content index comprises a symbol value corresponding to a content range of a subsequence of the time sequence.

In one embodiment of the present invention, a symbol value corresponding to a subsequence in the plurality of subsequences is stored as metadata associated with the spatial indices.

In one embodiment of the present invention, the search module 810B comprises: a converting module configured to convert the query sequence to the frequency domain based on Linear Discrete Transform; and a frequency search module configured to, according to characteristic frequencies in the frequency domain, search in the time sequence in the time series database for a spatial location that corresponds to the query sequence via the spatial indices.

In one embodiment of the present invention, the converting module comprises: a segmenting module configured to divide the query sequence into segments based on Segmentation Dimension Reduction; and a segment converting module configured to convert the query sequence to the frequency domain based on the segments.

In one embodiment of the present invention, there is further comprised: a dividing module configured to divide the query sequence into a plurality of query subsequences; and an integrating module configured to integrate spatial locations that are found and outputted for the plurality of query subsequences.

In one embodiment of the present invention, there is further comprised: a decomposing module configured to, in response to the query sequence being a multi-dimensional time sequence, decompose the query sequence into a plurality of one-dimensional query sequences.

In one embodiment of the present invention, the spatial index is an R-tree.

In one embodiment of the present invention, there is provided a method for managing a time series database, comprising: the above-described method for building indices for a time sequence in a time series database; and the above-described method for querying in a time series database.

In one embodiment of the present invention, there is provided an apparatus for managing a time series database, comprising: the above-described apparatus for building indices for a time sequence in a time series database; and the above-described apparatus for querying in a time series database.

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks illustrated in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

The invention claimed is:

1. A method for building indices for a time sequence in a time series database, comprising:
   dividing, using a processing device, a time sequence in the time series database into a plurality of subsequences based on a sliding window;
   building spatial indices for the plurality of subsequences, the spatial indices being used for defining spatial locations of subsequences in the plurality of subsequences in the time sequence; and
   building content indices for the plurality of subsequences, the content indices being used for defining content ranges of subsequences in the plurality of subsequences,
   wherein the building spatial indices for the plurality of subsequences comprises:
   converting the plurality of subsequences to a frequency domain based on Linear Discrete Transform; and
   building spatial indices for the plurality of subsequences according to characteristic frequencies in the frequency domain.

2. The method according to claim 1, wherein the building content indices for the plurality of subsequences comprises:
   mapping a subsequence in the plurality of subsequences to a symbol value corresponding to a content range of the subsequence.

3. The method according to claim 2, further comprising:
   storing a symbol value corresponding to a subsequence in the plurality of subsequences as metadata associated with the spatial indices.

4. The method according to claim 1, wherein the converting the plurality of subsequences to the frequency domain based on Linear Discrete Transform comprises:
   dividing the plurality of subsequences into segments based on Segmentation Dimension Reduction; and
   converting the plurality of subsequences to the frequency domain based on the segments.

5. The method according to claim 1, further comprising a pre-processing operation of:
   in response to the time sequence being a multi-dimensional time sequence, decomposing the time sequence into a plurality of one-dimensional time sequences.

6. A method for querying in a time series database, comprising:
   based on spatial indices for a time sequence in the time series database, searching with a processing device in the time sequence in the time series database for a spatial location that corresponds to a query sequence;
   based on content indices for the time sequence in the time series database, obtaining a content range of a subsequence at the found spatial location; and
   in response to the obtained content range being the same as a content range of the query sequence, outputting the subsequence at the found spatial location;
   wherein the spatial indices are used for defining spatial locations of subsequences of the time sequence in the time sequence, and the content indices are used for defining content ranges of subsequences of the time sequence,
   wherein the based on spatial indices for a time sequence in the time series database, searching in the time sequence in the time series database for a spatial location that corresponds to a query sequence comprises:
   converting the query sequence to a frequency domain based on Linear Discrete Transform; and
   according to characteristic frequencies in the frequency domain, searching in the time sequence in the time series database for a spatial location that corresponds to the query sequence via the spatial indices.

7. The method according to claim 6, wherein the content index comprises a symbol value corresponding to a content range of a subsequence of the time sequence.

8. The method according to claim 7, wherein a symbol value corresponding to a subsequence in the plurality of subsequences is stored as metadata associated with the spatial indices.

9. The method according to claim 6, wherein the converting the query sequence to the frequency domain based on Linear Discrete Transform comprises:
   dividing the query sequence into segments based on Segmentation Dimension Reduction; and
   converting the query sequence to the frequency domain based on the segments.

10. The method according to claim 6, further comprising:
    dividing the query sequence into a plurality of query subsequences; and
    integrating spatial locations that are found and outputted for the plurality of query subsequences.

11. The method according to claim 6, further comprising a pre-processing operation of:
    in response to the query sequence being a multi-dimensional time sequence, decomposing the query sequence into a plurality of one-dimensional query sequences.

12. An apparatus for building indices for a time sequence in a time series database, comprising a computer processor that comprises:
    a dividing module configured to divide a time sequence in the time series database into a plurality of subsequences based on a sliding window;
    a spatial index building module configured to build spatial indices for the plurality of subsequences, the spatial indices being used for defining spatial locations of subsequences in the plurality of subsequences in the time sequence; and
    a content index building module configured to build content indices for the plurality of subsequences, the content indices being used for defining content ranges of subsequences in the plurality of subsequences, wherein the spatial index building module comprises:

a converting module configured to convert the plurality of subsequences to a frequency domain based on Linear Discrete Transform; and a building module configured to build spatial indices for the plurality of subsequences according to characteristic frequencies in the frequency domain.

13. The apparatus according to claim 12, wherein the spatial index building module comprises:

a mapping module configured to map a subsequence in the plurality of subsequences to a symbol value corresponding to a content range of the subsequence.

14. The apparatus according to claim 13, wherein the computer processor further comprises:

a storage module configured to store a symbol value corresponding to a subsequence in the plurality of subsequences as metadata associated with the spatial indices.

15. The apparatus according to claim 12, wherein the converting module comprises:

a segmenting module configured to divide the plurality of subsequences into segments based on Segmentation Dimension Reduction; and a segment converting module configured to convert the plurality of subsequences to the frequency domain based on the segments.

* * * * *